United States Patent [19]
Gore et al.

[11] 3,709,256
[45] Jan. 9, 1973

[54] MEANS FOR CONTROLLING THE DIRECTION OF THE FLOW OF A LIQUID OR FLUID THROUGH A SELECTED OUTLET AND FOR SEALING SAID OUTLETS

[75] Inventors: William C. Gore, Elgin; Eugene B. Shapiro, Highland Park, both of Ill.

[73] Assignee: Beatric Foods Company, operating through its division Chicago Specialty Manufacturing Co., Skokie, Ill.

[22] Filed: Feb. 8, 1971

[21] Appl. No.: 113,140

[52] U.S. Cl..............................137/625.47, 251/312
[51] Int. Cl..............................................F16k 11/00
[58] Field of Search.......137/625.46, 625.47, 625.41; 251/312, 181, 182, 287, 288

[56] References Cited

UNITED STATES PATENTS

| | | | |
|---|---|---|---|
| 1,458,644 | 6/1923 | Dempsey | 251/312 |
| 3,525,363 | 8/1970 | Gore et al. | 137/625.47 |
| 2,433,732 | 12/1947 | Brown | 251/309 X |
| 3,254,872 | 6/1966 | Roos | 251/287 X |
| 2,836,388 | 5/1958 | Rakus | 251/309 X |
| 2,906,293 | 9/1959 | Fraser et al. | 137/625.41 X |
| 3,057,350 | 10/1962 | Couley | 137/625.41 X |
| 3,130,952 | 4/1964 | Meyer | 251/181 X |
| 3,536,101 | 10/1970 | Bosworth | 251/287 X |

*Primary Examiner*—Samuel Scott
*Attorney*—Max R. Kraus

[57] ABSTRACT

The device includes a housing having an inlet and two or more outlets, with a manually rotatable member positioned within said housing for selectively controlling the flow through said outlets. The rotatable member has a pair of curvilinear arms, with one of said arms supporting a pad formed of a semi-resilient material which serves to seal the outlets.

5 Claims, 6 Drawing Figures

PATENTED JAN 9 1973 3,709,256
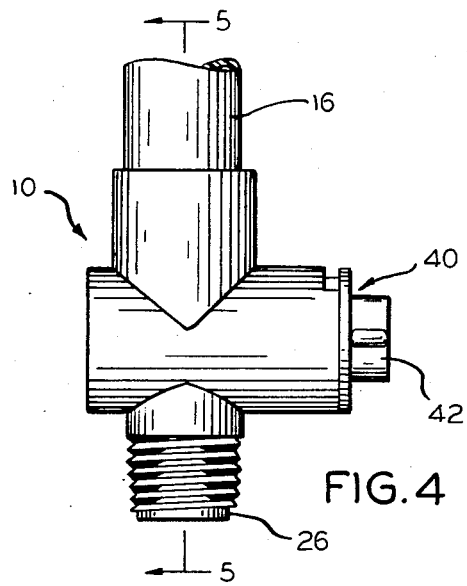
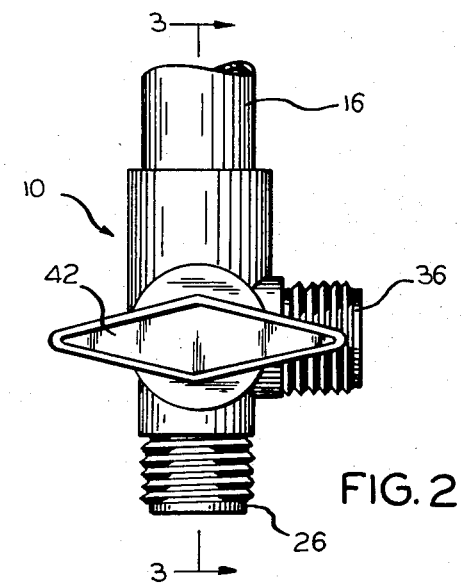
FIG. 4  FIG. 2
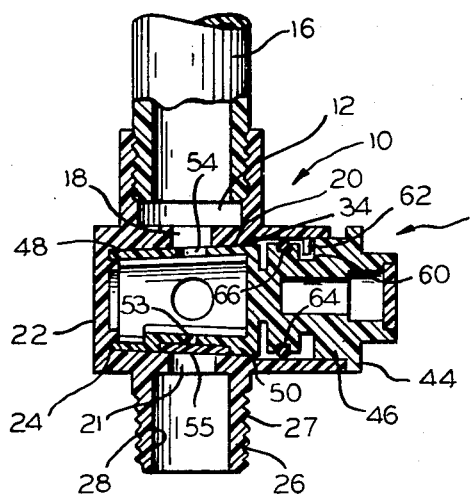
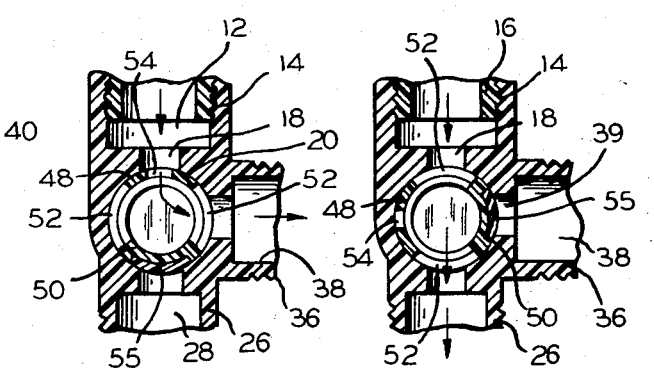
FIG. 3  FIG. 5  FIG. 6
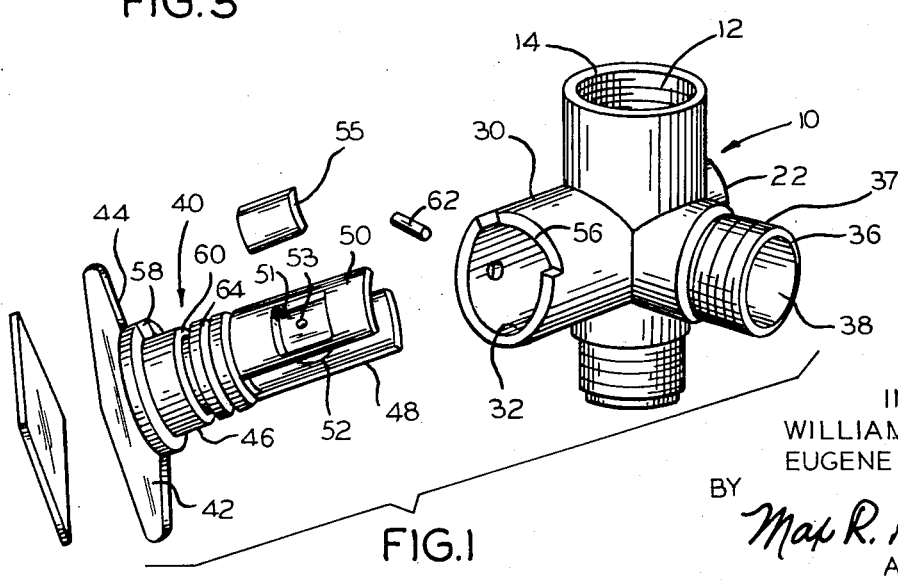
FIG. 1
INVENTORS
WILLIAM C. GORE
EUGENE B. SHAPIRO
BY Max R. Kraus
ATTORNEY

MEANS FOR CONTROLLING THE DIRECTION OF THE FLOW OF A LIQUID OR FLUID THROUGH A SELECTED OUTLET AND FOR SEALING SAID OUTLETS

BRIEF SUMMARY OF THE INVENTION

This invention is an improvement of the invention covered in our U.S. Pat. No. 3,525,363, issued on Aug. 25, 1970, and its objective is to provide means which more effectively seals the outlet ports and which also compensates for any irregularities which may be formed in the central bore of the housing during the molding of the housing.

BRIEF DESCRIPTION OF THE DRAWINGS

In the drawings:

FIG. 1 is an exploded perspective view of the components forming this invention.

FIG. 2 is an elevational view looking at same from the handle.

FIG. 3 is a sectional view taken on line 3—3 of FIG. 2.

FIG. 4 is a side elevational view.

FIG. 5 is a sectional view taken on line 5—5 of FIG. 4.

FIG. 6 is a view similar to FIG. 5 but with the rotatable member rotated 90° from that of FIG. 5.

The device includes a housing or body generally indicated by the numeral 10 which may be molded of plastic material. The housing has an upper inlet end designated by the numeral 12 which is a bore and which is internally threaded as at 14 so that it may be coupled or connected to the input pipe 16. Communicating with the inlet bore 12 is a port or passageway 18 of a reduced dimension which in turn communicates with a centrally positioned tubular or cylindrical-shaped bore 20 which extends transversely of the housing and which tapers towards the bottom end wall 22 of the bore. An annular recess 24 is formed in the bottom end wall 22 to accommodate the ends of the cantilever arms of the rotatable member, presently to be described.

The housing 10 has a lower end 26 which is externally threaded as at 27. The lower end has a bore 28 which communicates with the central transverse bore 20 through a reduced port or passageway 21 but which is in direct axial alinement with the bore or passageway 18. For purpose of this specification, the lower outlet end 26 may sometimes hereinafter be referred to as a first outlet. A shower head, not shown, is adapted to be attached or coupled to the lower end 26 of the body through the medium of the threads 27.

The body or housing 10 has a lateral extension 30 which is alined with the transverse bore 20 and said extension has a bore 32 communicating with the central transverse bore 20. The bore 32 has a slightly larger diameter than the diameter of the front end of the transverse bore 20. A shoulder 34 is provided therebetween.

The body or housing 10 has another lateral extension 36 which is positioned 90° from the lateral extension 30. The lateral extension 36 is externally threaded as at 37 and has a bore 38 which communicates with the central transverse bore 20 through a reduced port or passageway 39, as best seen in FIGS. 5 and 6. A flexible spray pipe, not shown, is adapted to be attached or coupled to the lateral extension 36 through the medium of the threads 37. This outlet in extension 36 may sometimes hereinafter be referred to as a second outlet.

Rotatably supported within the housing 10 is a rotatable member generally designated by the numeral 40 and best shown in perspective in FIG. 1, which is preferably molded of plastic or the like, and consists of a handle 42, an annular head 44, an annular neck or stem 46 of reduced diameter, and a pair of diametrically opposed spacer curvilinear or arcuate-shaped members or arms, one of which is designated by the numeral 48 and the other designated by the numeral 50. The spacing of the arms 48 and 50 provide a pair of longitudinal ports 52, one on each side of the arms, which are in alinement and which serve as passageways for the flow of the liquid or fluid, as will be subsequently described.

The arm 48 has an opening or port 54 which when the rotatable member 40 is inserted into the housing is adapted to register or aline with the bore 18. The arm 50 is provided with a recess or pocket 51 of rectangular shape and a small communicating opening 53. Seated within said recess 51 is a pad 55 of a vinyl plastic or medium hard rubber or a like material. Vinyl plastic is preferred because of its wear resistant qualities. The small opening 53 serves as a pressure relief opening when inserting the clost fitting pad 55 into the recess 51. The bottom of the recess 53 has a curvature conforming to the curvature of the arm 50 and the pad 55 also has a curvature conforming to the curvature of the arm 50.

When the rotatable member 40 is inserted into the tapered transverse bore 20 in the body, the linearly straight but radially curved arms 48 and 50 deflect towards each other and this causes the arms to assume the same tapered diameter of the transverse bore 20 in the body 10. The ends of the arms 48 and 50 are positioned in the annular recess 24 in the end wall of the body. As best seen in FIG. 3, the neck or stem 46 of the rotatable member 40 is positioned within the bore of the lateral extension 30, with the annular head 44 abutting against the outside edge of the lateral extension 30.

The pad 55 which has a semi-flexible surface will contact and bear against the wall surface of the cylindrical-shaped tapered bore 20 and will also bear against the ports 21 and 39 which communicate respectively with the bores 28 and 38 and thereby achieve a superior sealing with said ports. In the molding of the housing or body 10, the surface of the bore 20 may have certain irregularities and the pad 55 will compensate and adjust to those irregularities. In addition, the pad 55 will cause additional deflection of the arm 50 which in the tapered bore 20. The major springiness comes from the deflection of the arms 48 and 50 in the tapered bore 20. The pad 53 which is flexible to some extent adds to the springiness of the arm 50 and thereby increases the sealing of the ports with which it comes in contact.

The lateral extension 30 of the housing is provided with a 90° radial slot 56 at the edge of the extension to provide an open face slot. A detent 58 formed on the neck of the rotatable member 40 rides in said open face slot 56. The detent is adjacent the head 44 of said rotatable member. The 90° radial slot 56 and the detent 58 permits the rotatable member to be rotated 90°.

The neck or stem of the rotatable member 40 is provided with an annular groove or slot 60 which is engaged by a locking pin 62 inserted through a suitable opening in the lateral extension 30 of the housing to retain the rotatable member 40 within the housing. The neck or stem 46 of the rotatable member 40 has an annular recess 64 to accommodate a standard O-ring 66 to form a leak-proof connection between the rotatable member and the housing.

While the invention herein is not limited for use with a shower unit, one of its applications is for that purpose. In any case, the input or inlet bore 12 is threadedly connected to the input water pipe 16, or a shower unit, and the opposite outlet end 26 is threadedly connected to a shower head or the like. The lateral extension 36 is externally threaded and can be connected to a flexible hose (not shown) for a personal shower or the like.

The operation of the device will be apparent from the foregoing but briefly described is as follows. When the handle 42 positions the rotatable member 40 to the position shown in FIGS. 3 and 5, the flow will be through the port 54 of the arm 48 of the rotatable member 40 which will be in registry with the port or bore 18, with the other arm 50 closing the entrance into the lower outlet bore 28. In this position any water or fluid coming through the input pipe 16 into the inlet end would pass through the port 18, through the opening or port 54 in the arm 48, impinge against or be deflected by the lower arm 50 and be directed outwardly through the longitudinal port 52 of the rotatable member and through the bore 38 in the lateral extension 36. If a flexible hose is connected to the lateral extension 36 then the water will pass out through the flexible hose for a personal shower or the like.

By rotating the handle 42 counterclockwise 90°, the arms 48 and 50 are positioned as shown in FIG. 6, so that the two opposed longitudinal ports 52 between the arms are in registry with the upper inlet bore 18 and the lower outlet bore 28, in which case the water will pass through these alined bores 18 and 28 and be discharged through the lower outlet end 26 and through the shower head (not shown), but attached thereto. When it is desired to close off the outlet end 26 and have the water pass through the lateral outlet end 36, the handle 42 is rotated clockwise 90°.

What is claimed is:

1. Means for controlling the direction of flow of a liquid or fluid to a selected outlet, said means comprising a housing having an inlet and a first outlet and a second outlet, with said second outlet offset with respect to said first outlet, said housing having a central bore with ports communicating with said inlet and said first and second outlets, said central bore tapering inwardly toward the end wall of said housing, a rotatable member positioned in said bore, said rotatable member having a pair of diametrically opposed spaced curvilinear arms adapted to nest within said tapered central bore, said tapering bore causing said arms to deflect towards each other so that the arms apply a pressure against the ports communicating with said central bore, one of said curvilinear arms having a recess, a concavo-convex pad supported in said recess and conforming substantially to the curvature of the arm and contacting a portion of the surface of said central bore and adapted to be alined with and extend across said first and second outlets to seal said outlets, said spaced arms defining ports therebetween adapted to be selectively positioned in registry with said inlet port and with said first and second outlet ports when said rotatable member is rotated to direct the flow either through said first outlet port or through said second outlet port.

2. A device as defined in claim 1 in which the pad has a semi-flexible surface.

3. A device as defined in claim 1 in which the recess in said curvilinear arm has a curvilinear bottom and in which the concavo-convex pad conforms to the curvilinear bottom.

4. A device as defined in claim 3 in which the pad is of a vinyl plastic material.

5. A device as defined in claim 3 in which said recess has an opening communicating through the bottom wall of said recess.

* * * * *